United States Patent
Fattinger et al.

(10) Patent No.: US 6,827,907 B2
(45) Date of Patent: Dec. 7, 2004

(54) COMPOUND HANDLING SYSTEM

(75) Inventors: Christof Fattinger, Blauen (CH); Hansjörg Tschirky, Ettingen (CH)

(73) Assignee: Hoffmann-LA Roche Inc., Nutley, NJ (US)

( * ) Notice: Subject to any disclaimer, the term of this patent is extended or adjusted under 35 U.S.C. 154(b) by 0 days.

(21) Appl. No.: 09/741,542

(22) Filed: Dec. 20, 2000

(65) Prior Publication Data

US 2001/0002986 A1 Jun. 7, 2001

Related U.S. Application Data

(63) Continuation of application No. 09/156,074, filed on Sep. 17, 1998, now abandoned.

(30) Foreign Application Priority Data

Sep. 29, 1997 (EP) .......... 97116891

(51) Int. Cl.[7] .............................. B01L 9/00
(52) U.S. Cl. ............ 422/104; 422/102; 422/99; 206/443; 211/74
(58) Field of Search ........... 422/99–104; 211/74; 206/443

(56) References Cited

U.S. PATENT DOCUMENTS

| | | | | |
|---|---|---|---|---|
| 4,055,396 A | * | 10/1977 | Meyer et al. ......... 248/311.2 |
| 4,495,150 A | * | 1/1985 | Cook et al. ........... 134/115 R |
| 4,510,119 A |   | 4/1985 | Hevey |
| 4,534,465 A | * | 8/1985 | Rothermel et al. ......... 206/443 |
| 5,048,957 A | * | 9/1991 | Berthold et al. ............ 356/246 |
| 5,080,232 A | * | 1/1992 | Leoncavallo et al. ....... 206/443 |
| 5,098,663 A | * | 3/1992 | Berthold et al. ............ 422/104 |
| 5,128,105 A | * | 7/1992 | Berthold et al. ............ 422/102 |
| 5,514,343 A | * | 5/1996 | Verwohlt et al. ........... 422/104 |
| 5,551,828 A |   | 9/1996 | Iles |
| 5,579,929 A | * | 12/1996 | Schwartz .................... 206/446 |

FOREIGN PATENT DOCUMENTS

| | | |
|---|---|---|
| EP | 0 219 802 | 4/1987 |
| JP | S58-208663 | 4/1985 |
| JP | H5-097233 | 4/1993 |
| JP | H5-162812 | 6/1993 |

* cited by examiner

*Primary Examiner*—Yelena Galeh
*Assistant Examiner*—Elizabeth Quan
(74) *Attorney, Agent, or Firm*—George W. Johnston; Patricia S. Rocha-Tramaloni; Bernard Lau

(57) ABSTRACT

A compound handling system handles a multiplicity of chemical or biological compounds or samples, and is especially adapted for high throughput screening of compounds that are stored and handled in aliquotted form. Aliquots are contained in individual containers and the containers are arranged in racks having holding spaces open at opposite ends. Insertion and removal of the containers is effected in either direction of movement, and each container may be sealed with foil to protect its integrity.

6 Claims, 2 Drawing Sheets

COMPOUND HANDLING SYSTEM

CROSS REFERENCE TO RELATED APPLICATION

This is a continuation of patent application Ser. No. 09/156,074, filed Sep. 17, 1998 now abandoned.

BACKGROUND OF THE INVENTION

1. Field

The subject invention relates to a system for handling a multiplicity of chemical or biochemical compounds or samples.

2. Description

In pharmaceutical research, chemical or biochemical compounds are routinely screened for their potential activity. Hundreds or thousands of small-volume, compound-containing samples ("aliquots") must be screened in the shortest time possible. Presently, aliquots are pipetted on demand from reservoir containers in which individual compounds are stored.

Compound-containing samples are oftentimes deep frozen for long term storage, thus necessitating that the samples be thawed for aliquot pipetting and then refrozen. Unfortunately, this procedure is cumbersome and time consuming. Moreover, frequent freezing and thawing cycles may result in compound deterioration, and reiterated pipetting may lead to contamination of the compounds. In each case, valuable and expensive compounds may have to be phased out and/or replaced before the entire quantity has been used. This wasting of compounds may represent a substantial economic loss.

It is the aim of the present invention to provide a compound handling system which is not afflicted with these disadvantages.

SUMMARY OF THE INVENTION

The subject invention provides a system for handling a multiplicity of tubes that each contain an aliquot of a chemical or biological sample. The system comprises a rack, means for inserting a tube into a storage compartment, and means for removing a tube from a storage compartment. The rack holds a multiplicity of tubes, and has a top side and a bottom side and storage compartments. Each storage compartment is configured and dimensioned to receive a tube containing a chemical or biological sample, and is open at the top side of the rack and open at the bottom side of the rack so that a tube can be inserted into the storage compartment from either the top side of the rack or the bottom side of the rack and can be removed from the storage compartment from either the top side of the rack or the bottom side of the rack.

BRIEF DESCRIPTION OF THE FIGURES

Preferred embodiments of the invention are described with reference to the accompanying drawings.

DETAILED DESCRIPTION OF THE INVENTION

The invention will now be described in terms of its preferred embodiments. These embodiments are set forth to aid in understanding the invention but are not limiting.

According to the invention, compound handling is achieved by a compound handling system which stores compounds in aliquotted form. Each aliquot is contained in a separate container, and the containers are arranged in racks. The racks have container holding spaces which are open at opposite ends to the effect that insertion of the containers into the racks and their removal therefrom can be effected in either direction of movement.

Advantageously, the rack with the inserted containers resembles the shape of a microtiter plate which can be handled by the conventional robots used in high throughput screening.

Figure 1:
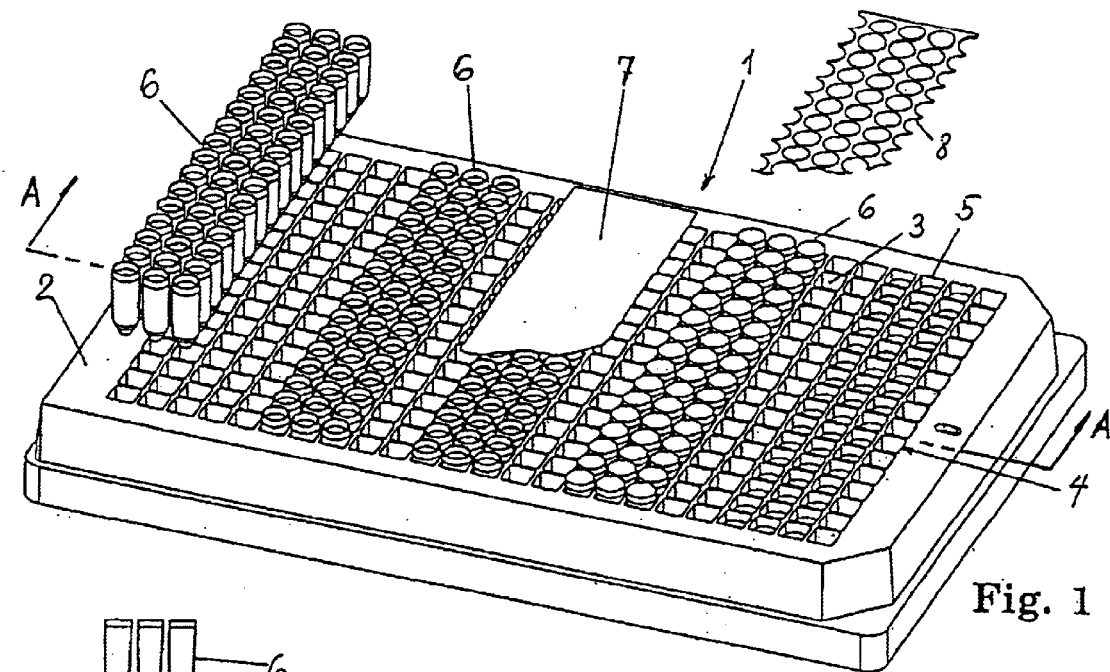
FIG. 1—a perspective view of a storage rack with containers in various typical positions FIG. 2—a crossectional view along line A—A in FIG. 1

The storage plate or rack 1 shown in perspective representation in FIG. 1 has a peripheral frame portion 2 for mechanical rigidity, and grid-like arrangement of separation walls 3 defining sixteen rows 4, each row 4 having twenty-four individual rectangular storage compartments 5. Collectively, these three hundred eighty-four (384) storage compartments are configured and dimensioned to hold an equal number of microtubes 6.

The storage compartments 5 are open at both ends, i.e. at the top surface and at the bottom surface of rack 1. The purpose of the two openings will be explained later in this specification.

Figure 2:
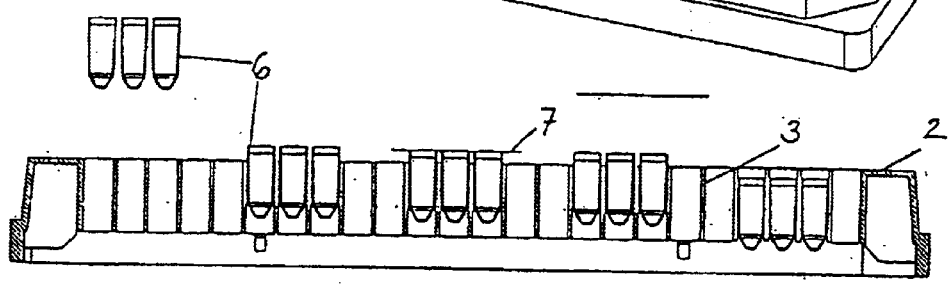
Figure 3:
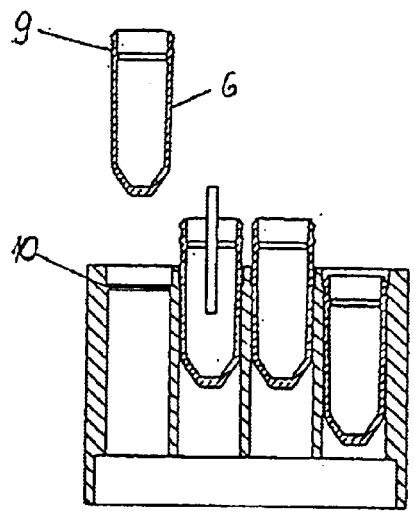
FIG. 3—a more detailed view of a portion of FIG. 2

Various groups of microtubes 6 are shown in FIGS. 1–3 in different positions relative to the rack 1. This situation is shown for demonstration purposes only and does not represent a situation encountered during normal operation. In normal use, all the tubes belonging to one rack are in the same position which may be any one of those shown in FIG. 1.

Referring to the FIG. 2 the first group of microtubes on the left side of the rack 1 is in the position prior to insertion of the tubes into the rack. Moving left in FIG. 2, the second group of microtubes has been inserted in the rack 1 but only to a position where the upper rims of the tubes still project above the upper surface of the rack. This is the filling position in which aliquots of compounds are pipetted into the tubes. After the tubes have been filled, they remain in the same position for the next processing step, i.e. closing or sealing the tubes. All the tubes of a rack together are covered with an aluminum foil 7 (see the third group of tubes in FIG. 2) which is sealed, e.g. affixed onto the upper edges of the tube openings. The technology for this step is well known in the packaging art, e.g. from the closing of blister packs with aluminum foil.

These procedural steps, especially the filling and sealing, are preferably performed under sterile conditions or inert gas to avoid contamination of the compounds. Moreover, pipetting is preferably performed by pipetting systems having multiple pipettes that simultaneously fill the groups of tubes.

Moving further left in FIG. 2, the fourth group of tubes is shown after the foil has been punched around the upper edges of the tube openings. Also shown is the remainder 8 of the foil after punching. In the fifth group of tubes (shown at the right side of FIG. 2), the tubes are fully placed inside the storage compartment 5 (the fully inserted position). To move the tubes into this position they may be pushed down by a suitable stamp or piston after the foil has been punched. Alternatively, after affixing the foil, the tubes may be pushed upwards and entirely out of the rack into the punching tool, and afterwards reintroduced into the rack from below. This alternative allows safer separation of the foil without breakage.

In the fully inserted position, the tubes are stored in the rack 1 in a storage room under appropriate storage conditions such as low temperature, darkness etc. These storage conditions and the sterility during filling and sealing, permit the compounds to be stored for very long times without deterioration.

The tubes are made of a material which stays elastic at lower temperatures, such as −20 degrees Celsius ("° C."). It has been found that polypropylene is suitable for this purpose.

FIG. 3 shows certain features of the tubes and the storage cavities for holding the tubes in place. The preferred tubes are provided with two parallel annular ridges 9 around the upper portion of their outside wall. The separation walls 3 defining the cavities 5 are provided with projections 10 extending parallel to and at a small distance below their upper edge. When the tubes are being fully inserted as shown for the group of tubes at the right of the rack, the projections 10 snap in between the two ridges 9. In this position, the tubes are safely held in their places.

Figure 4:
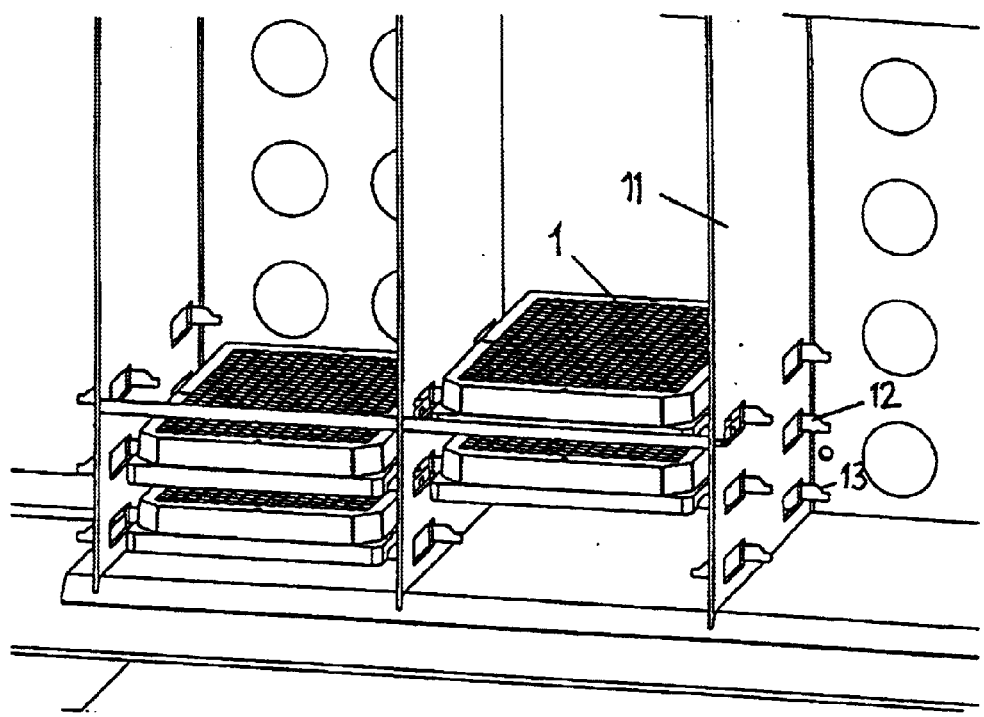
FIG. 4—an inside view of a storage room

The storage racks with the tubes containing the aliquots are stored in a cold room (shown in FIG. 4). The cold room is humidity-controlled and kept at a temperature of −20° Celsius. The cold room is equipped with vertical shelf partition walls 11 having support elements 12 extending therefrom. The support elements are provided with inclined upper edges 13 for the purpose of centering the racks 1 resting thereon.

Figure 5:
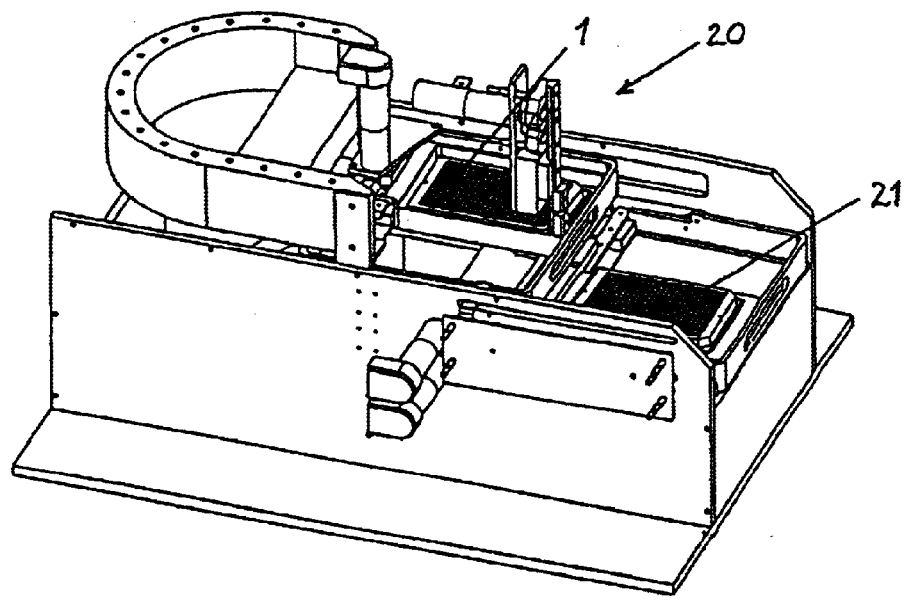
FIG. 5—a perspective view of a transfer system for transferring individual containers from storage plates to transport plates.

Putting together a selection of compound aliquots according to certain selection criteria is effected in a transfer station 20 shown in FIG. 5. This transfer station is inside the storage room or in an area connected to it having the same temperature conditions. The compound selection is assembled on transport rack 21 placed in the station. The rack 21 may be of the same type as the storage racks 1 or could be of different size. It is advantageous however that it has the same cavity pattern as the storage racks.

The transfer station contains conveying means for placing a storage rack 1 containing at least one tube with a desired compound aliquot in it on top of the transport rack. The two superposed racks are arranged such that the cavity containing the desired tube is in line with the transport rack cavity which is to receive the desired aliquot. In this relative position the tube is simply pushed from its storage position into the appropriate position in the transport rack.

Conveying means as well as electronic control means needed for the relative positioning of the two racks are well known in the art of automation as so-called X-Y movement or manipulator and need not be described here in detail.

The subject invention has been described in terms of its preferred embodiments. After reading the specification, other embodiments will become obvious to the skilled artisan. For example, the microtubes could be made of any number of suitable substances, including other polymers, such as polyethylene. The annular ridge-projection tube retaining system described above could also be replaced with a suitable tension fit or other biasing system to retain the microtubes in place. Accordingly, the subject invention should only be limited by the claims that follow and their equivalents.

What is claimed is:

1. A rack for use in a compound handling system for handling a multiplicity of tubes containing aliquots of chemical or biological samples, which comprises:

a peripheral frame, said frame having a top side and a bottom side;

grid-like separation walls that define a plurality of rows of storage compartments within said frame, each compartment being configured and dimensioned for receiving a substantial part of a sample tube, said storage compartments being adjacent to each other and defined by separation walls between them, each of said storage compartments having an inner wall and a top opening at the top side of the frame and a bottom opening at the bottom side of the frame so that a sample tube is insertable into the storage compartment from both the top side of the frame and the bottom side of the frame and is removable from the storage compartment through both the top opening and the bottom opening of the storage compartment, the cross-section of each of said storage compartment being constant over the entire length of the storage compartment, whereby a sample to be inserted into the storage compartment through the top opening thereof can be removed from the storage through the bottom opening of the storage compartment, and means for retaining a sample tube within each of said storage compartments, said retaining means comprising a projection of the inner surface of the wall of each storage compartment, said projection being suitable for snapping between two ridges of the outer wall of a sample tube that is positioned within said compartment.

2. A rack according to claim 1, wherein each of said compartments suitable for receiving and holding an entire sample tube.

3. A rack according to claim 1, wherein each of said storage compartment is rectangular.

4. A system for handling a plurality of sample tubes, said system comprising (a) A rack for use in a compound handling system for handling a multiplicity of tubes containing aliquots of chemical or biological samples, which comprises:

a peripheral frame, said frame having a top side and a bottom side;

grid-like separation walls that define a plurality of rows of storage compartments within said frame, each compartment being configured and dimensioned for receiving a substantial part of a sample tube, said storage compartments being adjacent to each other and defined by separation walls between them, each of said storage compartments having an inner wall and a top opening at the top side of the frame and a bottom opening at the bottom side of the frame so that a sample tube is insertable into the storage compartment from both the top side of the frame and the bottom side of the frame and is removable from the storage compartment through both the top opening and the bottom opening of the storage compartment, the cross-section of each of said storage compartment being constant over the entire length of the storage compartment, whereby a sample to be inserted into a storage compartment through the top opening thereof can be removed from the storage through the bottom opening of the storage compartment, and means for retaining a sample tube within each of said storage compartments, said retaining means comprising a projection of the inner surface of the wall of each storage compartment, said projection being suitable for snapping between two ridges of the outer wall of a sample tube that is positioned within said compartment; and (b) a plurality of sample tubes each of which contains an aliquot of a chemical or biological sample, each of said sample tubes having a shape that fits into a storage chamber of said rack and that enables insertion of the sample tube into one of said storage compartments from both the top side of the frame and the bottom side of the frame with one and the same orientation of the sample tube with respect to the frame, the outer wall of each of said sample tubes having two annular ridges located in planes which are parallel to other and normal to the length axis of the sample tube.

5. A system according to claim 4, wherein each of said compartment is suitable for receiving and holding an entire sample tube.

6. A system according to claim 1, wherein each of said storage compartment is rectangular.

* * * * *